INVENTORS
EVERETT W. FARMER
ERNEST E. VAN HAM

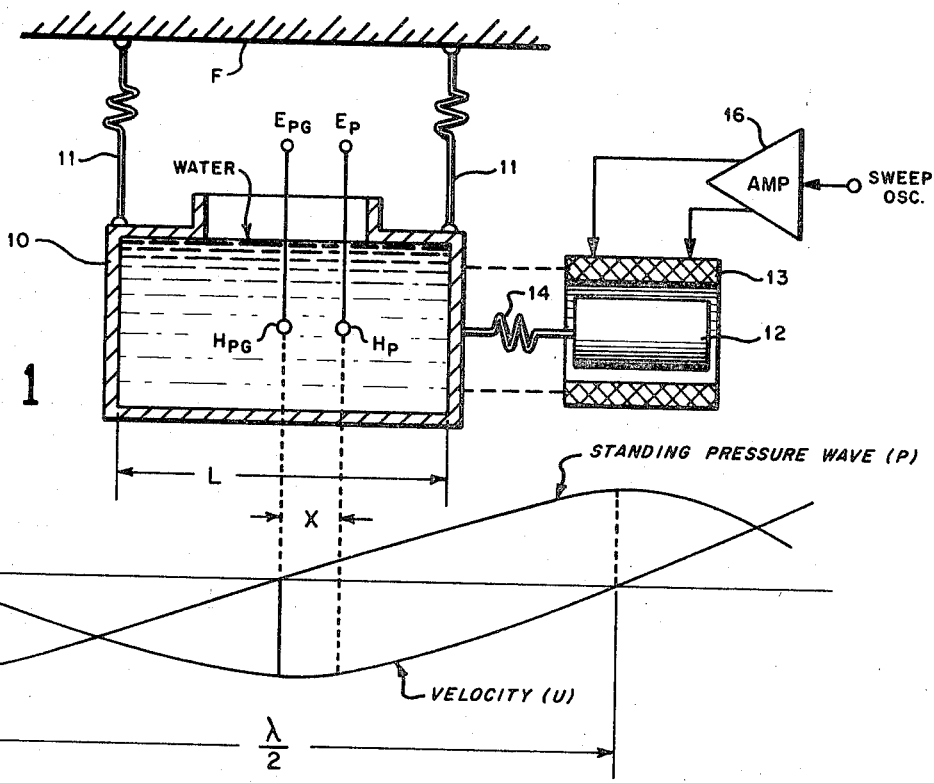
Fig. 1
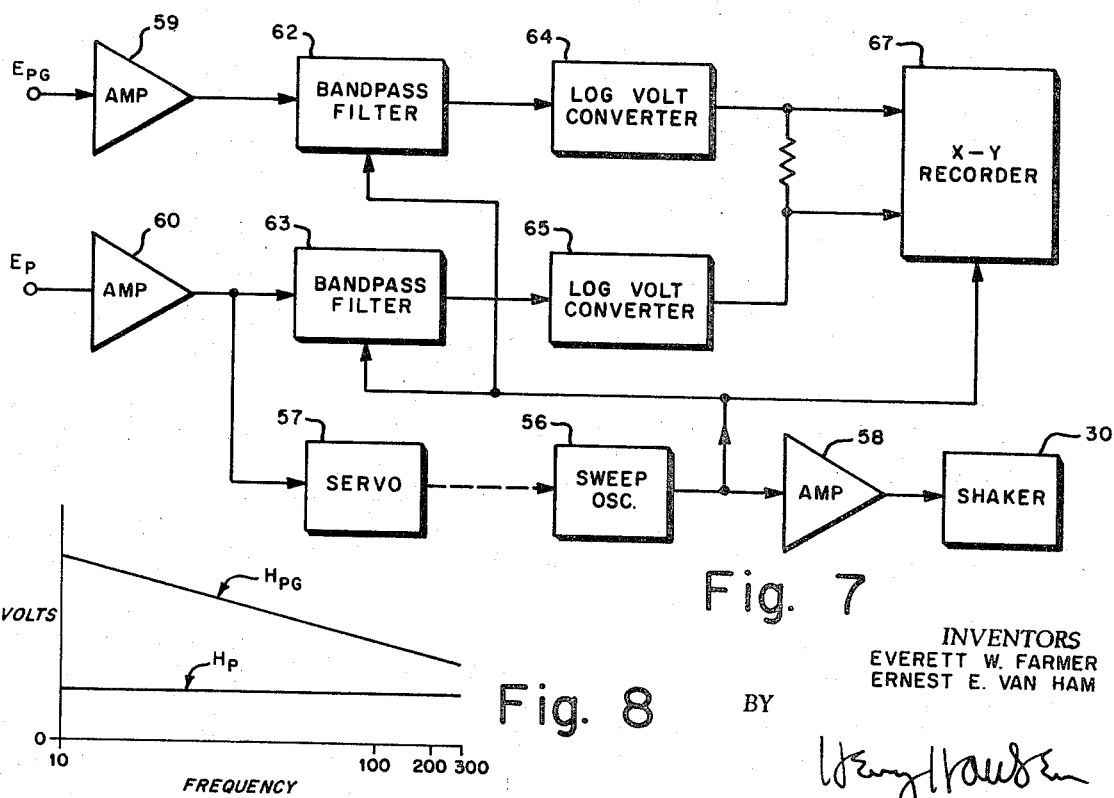
Fig. 7
Fig. 8
INVENTORS
EVERETT W. FARMER
ERNEST E. VAN HAM
BY
ATTORNEY Dec. 22, 1970        E. W. FARMER ET AL        3,548,631
PRESSURE GRADIENT HYDROPHONE CALIBRATOR
Filed July 30, 1969                           3 Sheets-Sheet 2
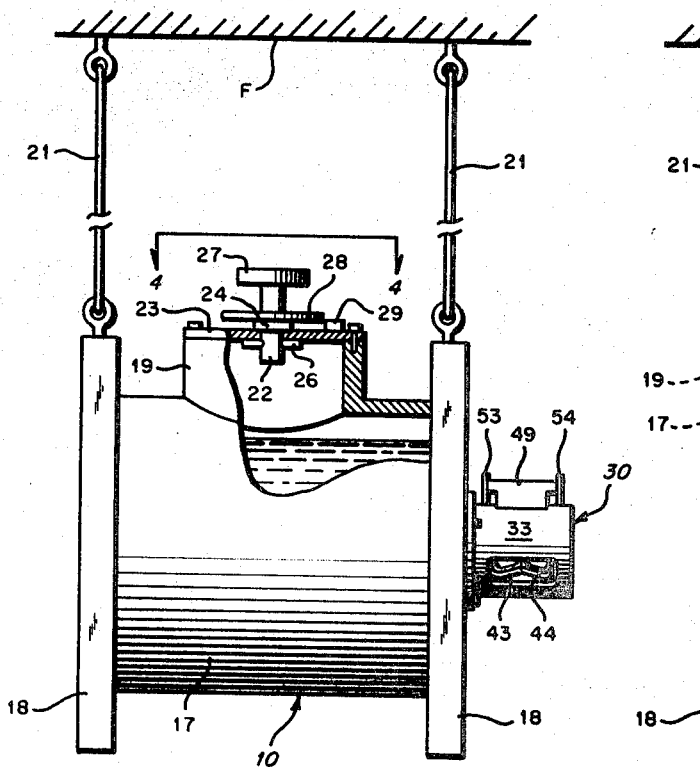
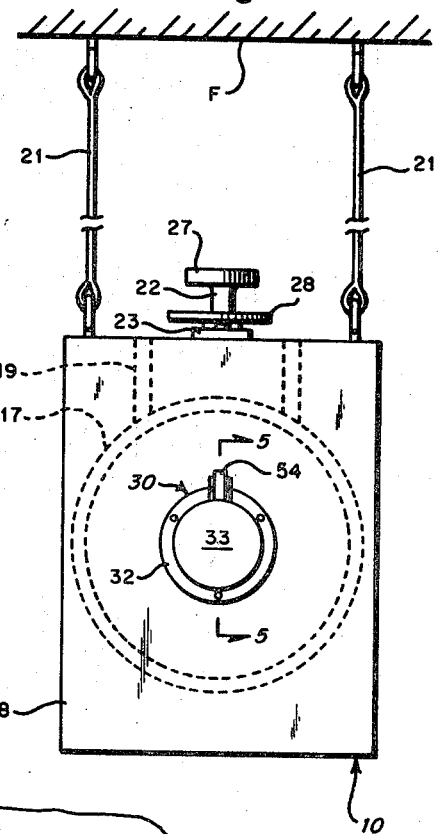
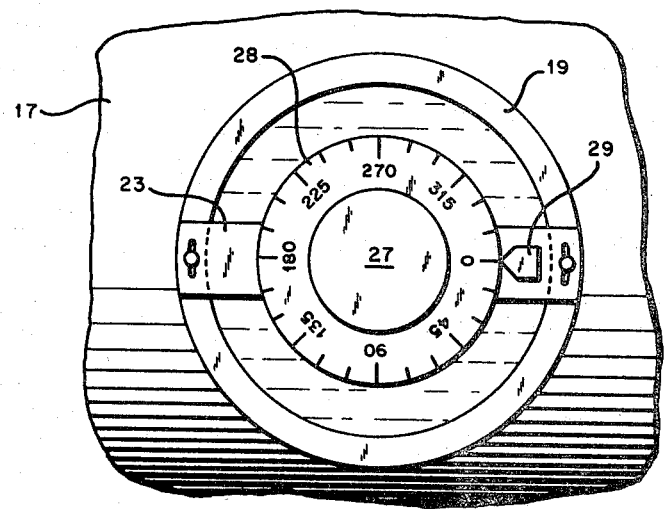
Fig. 4
INVENTORS
EVERETT W. FARMER
ERNEST E. VAN HAM
BY
ATTORNEY

United States Patent Office 3,548,631
Patented Dec. 22, 1970

3,548,631
PRESSURE GRADIENT HYDROPHONE
CALIBRATOR
Everett W. Farmer, Nashau, and Ernest E. van Ham,
Lyndeborough, N.H., assignors, by mesne assignments,
to the United States of America as represented by the
Secretary of the Navy
Filed July 30, 1969, Ser. No. 846,096
Int. Cl. G01h 3/00; G12b 13/00
U.S. Cl. 73—1                                    8 Claims

ABSTRACT OF THE DISCLOSURE

A pressure-gradient hydrophone calibrator comprising a rigid-wall tank of water suspended from fixed overhead structure and oscillated by mass reaction. A shaker fixed directly to the tank induces a pressure wave in the water as a result of the mass reaction, where the driving mass is an armature in the shaker and the reactive mass is the water-filled tank. This results in decreased ambient noise transmission to the water and less expensive construction of the calibrator.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to apparatus for determining the response characteristics of hydrophones, and more particularly to apparatus for measuring the sensitivity of a pressure-gradient hydrophone through an acoustic frequency range.

Most hydrophones are pressure sensitive; that is, the electrical energy generated by the hydrophone in an acoustic wave has maximum power when the sinusoidal variation in the field pressure is maximum. In contradistinction, a pressure-gradient hydrophone in an acoustic wave generates maximum electrical energy when the sinusoidal variation in the field particle velocity is maximum. Such hydrophones, suitable for calibration according to the present invention, are disclosed in U.S. Pats. 2,404,375 and 2,405,210 issued respectively to A. H. Inglis and W. R. Harry. These hydrophones are responsive to the pressure gradient established between different portions of the transducer element by the particle velocity of a propagating acoustic wave. Their outputs will not vary with changes in the field pressure.

The pressure-gradient hydrophone is also directionally responsive in that, for an acoustic wave of constant velocity amplitude, the open-circuit voltage will be maximum along the direction of propagation, and minimum 90 degrees displaced therefrom. This feature makes the pressure-gradient hydrophone particularly useful, in combination with an omnidirectional pressure hydrophone, for measuring the direction to a sound source.

Since the pressure-gradient transducer is only responsive to the particle velocity in a fluid field, various types of laboratory test apparatus have been developed for producing predictable particle velocities in the field. In one such apparatus, the pressure-gradient hydrophone to be tested is placed at the center of a water-filled drum which is longitudinally suspended from a frame and longitudinally oscillated by an exciter motor mounted on the frame. The frame must be massive and very stiff so that it will not resonate within the test frequency range. In addition, very expensive and large vibration isolators are required in order to prevent ambient noise from earth motion being transmitted through the frame and exciter to the hydrophone.

SUMMARY OF THE INVENTION

Accordingly, it is a general purpose and object of the present invention to provide an improved test apparatus for measuring and determining the sensitivity of pressure-gradient hydrophones through an acoustic frequency range in which ambient noise induced by earth motion is substantially isolated therefrom. It is another object of the invention to provide apparatus resulting in a considerable reduction in weight, size and cost to manufacture and maintain.

This is accomplished according to the present invention by providing a rigid-walled container of fluid in which pressure-gradient hydrophones can be calibrated, and sinusoidally exciting the container by the principle of mass reaction. The container comprises a right-circular cylindrical tank filled with water and suspended by compliant cords from fixed structure. The container is adapted to support a pressure-gradient hydrophone at the cylindrical axis and longitudinal midpoint of the tank, and a pressure hydrophone at the same axis but displaced from the midpoint. An electromagnetic shaker having its armature resiliently coupled to the tank provides a sinusoidal motion to the tank and induces a standing acoustic wave in the fluid with its pressure node at the longitudinal midpoint.

BRIEF DESCRIPTION OF THE DRAWING

FIG. 1 is a schematic diagram of a pressure-gradient hydrophone calibrator according to the invention positioned in relation to a postulated standing acoustic wave generated in the tank;

FIG. 2 is a more detailed, side view of the calibrator of FIG. 1;

FIG. 3 represents an end view of the calibrator as viewed from the right in FIG. 2;

FIG. 4 represents a top view of a portion of the calibrator of FIG. 2 which includes a hydrophone support assembly according to the invention;

FIG. 7 is a schematic block diagram of the signal processing system according to the invention as applied to the calibrator; and FIG. 8 is a typical calibration curve plotted in the system of FIG. 7.

DESCRIPTION OF PREFERRED EMBODIMENT

Figure 5:
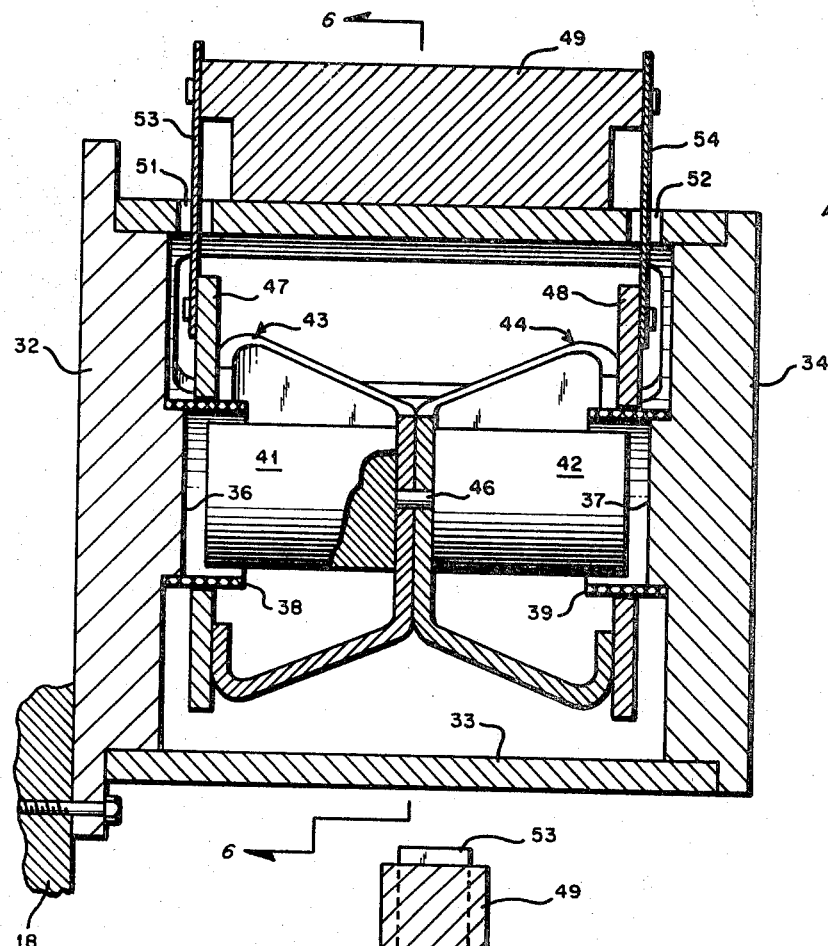
FIG. 5 represents a cross-sectional view of a shaker according to the invention taken along the line 5—5 of FIG. 3.
Figure 6:
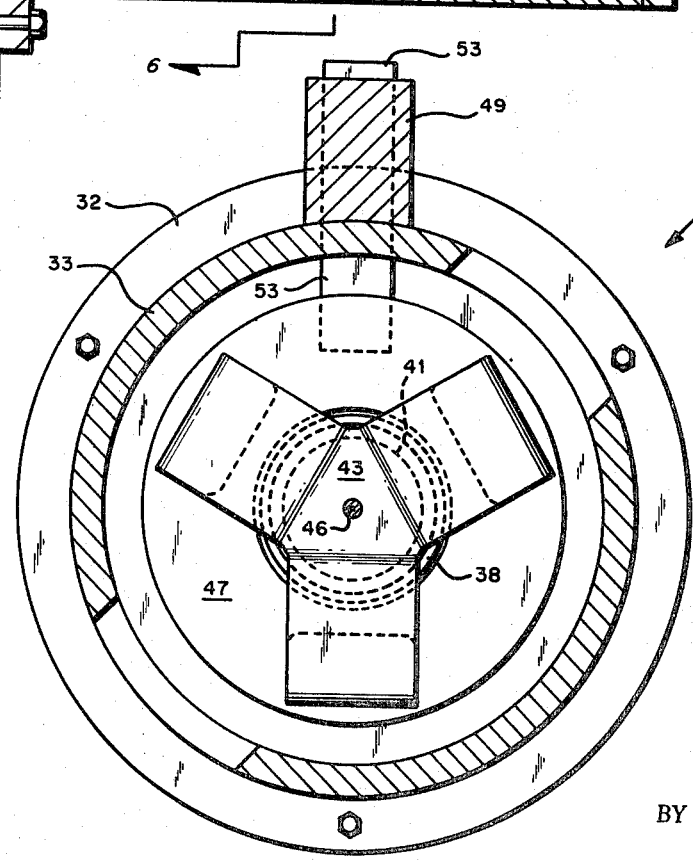
FIG. 6 represents a cross-sectional view of the shaker taken along the line 6—6 of FIG. 5.

The response or sensitivity M of a pressure transducer is usually defined as $$M = E/P \qquad (1)$$

where E=the open-circuit output voltage of the transducer, and P=the free-field pressure at the transducer. Since pressure-gradient transducers do not produce an output with free-field pressure variations, per se, an equivalent free-field pressure corresponding to the particle velocity at the pressure-gradient transducer is determined for computing its sensitivity M.

A technique for determining the equivalent free-field pressure as applied to the present invention is illustrated in FIG. 1. A pressure-gradient hydrophone $H_{PG}$ is placed at the geometric center of a horizontally-suspended, water-filled cylindrical tank 10 having an internal length L which is less than the shortest wave length (i.e., highest frequency) to be encountered in calibration. The tank is suspended from any convenient fixed overhead structure F by compliant members 11. A pressure hydrophone $H_P$ is placed in the tank at the cylindrical axis a distance $x$ from hydrophone $H_{PG}$ and the electrical output terminals of each are brought out of the tank for measuring the open-circuit voltages $E_{PG}$ and $E_P$, respectively. An armature 12, connected by spring 14 to the tank is horizontally oscillated by a solenoid coil 13 rigidly connected as shown by the dashed lines to the tank. The electrical excitation frequency for oscillating the armature is obtained from the output from a sweep oscillator through a power amplifier 16.

The motion of tank 10 resulting from the applied force through spring 14 produces a standing pressure wave P as shown in FIG. 1 with its node at pressure-gradient hydrophone $H_{PG}$. Since the velocity U variation lags the pressure variation by one-quarter wave length, the pressure P at the hydrophone $H_{PG}$ will be minimum when the particle velocity U is maximum. A more detailed explanation of this phenomena is disclosed in Fundamentals of Sonar by J. Warren Horton, United States Naval Institute, Annapolis, Md.; 1957, pages 31–34.

It is therefore necessary to determine an equivalent free-field pressure at the hydrophone $H_{PG}$. This is accomplished by measuring the pressure with a calibrated pressure hydrophone $H_P$ a distance $x$, and computing the equivalent free-field pressure at the pressure-gradient hydrophone and, finally, relating this computed pressure to the open-circuit voltage of the pressure-gradient hydrophone for indicating its sensitivity $M_{PG}$.

The relationship between the equivalent free-field pressure at the pressure node and the pressure at any distance $x$ from the node may be explained as follows. Horizontal oscillation of the tank 10 produces two pressure waves $P_R$ and $P_L$ moving to the right and left, respectively. That is, vectorially, $$\bar{P}_R = P_1 e^{jKx} \quad (2)$$

and $$\bar{P}_L = P_2 e^{-jKx} \quad (3)$$

where $P_1$, $P_2$ = the maximum root mean square (RMS) amplitude of the pressure waves,
$e$ = natural log (2.7182818),
$K = 2\pi/\lambda$ ($\lambda$ is wavelength), and
$x$ = the distance from the node to the pressure point.

The total pressure at any point in the tank 10, is therefore the vector summation $\bar{P} = \bar{P}_R + \bar{P}_L$
$\bar{P} = P_1 e^{jKx} + P_2 e^{-jKx}$
$\bar{P} = P_1 \cos Kx + P_2 \cos Kx + j[P_1 \sin Kx - P_2 \sin Kx] \quad (4)$ Assuming perfect reflection at the ends of the tank 10, i.e., $P_1 = -P_2$, then $\bar{P} = (P_1 - P_1) \cos Kx + j(P_1 + P_1) \sin Kx$
$\bar{P} = 2P_1 \sin Kx \quad (5)$ Thus, it can be seen that the pressure in the tank 10 is sinusoidal and time-varying and can be represented by an RMS amplitude which varies with the distance $x$ within the tank 10. For example, the pressure P is zero when sin $Kx = 0$ and maximum when sin $Kx = 1$.

This pressure P is measured by the calibrated hydrophone $H_P$, and the equivalent free-field pressure at hydrophone $H_{PG}$ can then be computed with Equation 5. The term $x$ corrects for the distance offset from the node, and the term K corrects wavelength.

The sensitivity $M_{PG}$ of the pressure-gradient hydrophone may now be expressed in terms of equivalent free-field pressure by combining Equation 1 and Equation 5. Thus, $$M_{PG} = \frac{E_{PG}}{P \sin Kx} \quad (6)$$

Substituting $E_P/M_P$ for P, and translating into logarithmic terms for addition and subtraction, the pressure-gradient hydrophone sensitivity $M_{PG}$ is finally expressed as follows:

$$\log M_{PG} = [\log E_{PG} - \log E_P] + [\log M_P - \log \sin Kx] \quad (7)$$

The first-bracketed term is recorded, and the second-bracketed term is added by bias correction.

The construction of apparatus according to the invention for accomplishing the foregoing calibration will now be described in more detail. The tank 10, as shown in FIGS. 2 and 3, comprises a horizontally-suspended cylindrical tube 17 closed at either end by wall plates 18. A cylindrical tube 19 about an opening in the top and intermediate the ends of the tube 17 provides communication with the inside of the tank. The dimensions and materials of construction must be such as to assure wall rigidity in the calibration frequency range. In one embodiment which is suitable for use between 10 and 300 Hz., the tubes 17 and 19 are constructed of one-inch thick aluminum; tube 17 is 11 inches long and 11 inches in diameter; and tube 19 is 6 inches in diameter. The tubes and end plates are welded to each other.

The tank 10 is suspended by four compliant members 21 (diagrammatically identified by numeral 11 in FIG. 1) vertically depending from the fixed structure F with the lower end of each member connected adjacent a respective side of wall plates 18. The members 21 may be of any convenient construction such as elastic cord with a natural frequency, in combination with the tank 10 below the calibration frequency range anticipated. In one embodiment which is suitable for use between 10 and 300 Hz., the natural frequency is 2.0 Hz.

The pressure-gradient and pressure hydrophones $H_{PG}$ and $H_P$ are inserted through tube 19 into the tank 10. The hydrophone $H_{PG}$ is suspended from a vertical shaft 22 rotatably mounted in a horizontal bar 23 midway between the ends of the tank 10. The bar 23 is secured at its ends to the top of the tube 19 at diametrically opposite sides thereof. The vertical position of the shaft 22 is determined by a shoulder 24 intermediate the ends, and a removable pin 26 in the shaft 22 which respectively abut the upper and lower surfaces of the bar 23. A hand wheel 27 affixed to the upper end of the shaft 22 facilitates manual rotation thereof with the azimuthal position being indicated on a plate 28 graduated in degrees fixed to shaft 22 by a pointer 29 fixed to bar 23. It is contemplated that the pressure-gradient hydrophone $H_P$ be suspended from the shaft 22 in the tank 10 by flexible stringers in a manner so that the hydrophone will concomitantly rotate with shaft 22 about the vertical axis. It is further contemplated that the reference pressure hydrophone $H_{PG}$ be suspended in the tank at distance $x$ by any convenient means which will maintain isolation from extraneous vibration. A distance $x$ of about 6 inches has been found satisfactory for the particular embodiment herein described.

Horizontal oscillation of the tank 10 by mass reaction is obtained by means of a shaker, identified generally by the numeral 30, rigidly mounted on the outside of one of the walls 18 coaxial with tube 17.

Referring to FIG. 5, the shaker 30 comprises a circular support flange 32 which is coaxially welded or bolted to the wall 18 and coaxially receives and encloses one end of a coaxial cylindrical case 33. The other end of the case is enclosed with an end cover 34.

The flange 32 and cover 34, respectively, include inwardly extending circular bosses 36 and 37 supporting coaxial solenoid stator coils 38 and 39 (numeral 13 in FIG. 1). A pair of cylindrical armature magnets 41 and 42 (numeral 12 in FIG. 1), are coaxially positioned in tandem, in a manner described hereinbelow, with their distal ends extending into the stator coils 38 and 39, respectively. The axial distance between the distal ends of the magnets 41 and 42 is less than the axial length between the confronting surfaces of bosses 36 and 37 by an amount sufficient to permit the magnets to oscillate freely within the contemplated power and frequency ranges for calibration.

The magnets 41 and 42 are secured between their confronting ends by end bell frames 43 and 44 each of which comprises a center section to which the magnets are secured, and three equiangularly-spaced radial arms terminating adjacent the distal end of the magnet and about the stator coil associated therewith. The bell frames 43 and 44 are affixed "back-to-back" at their center sections by a coaxial dowel pin 46. The arm terminals of frames 43 and 44 are fixed to support rings 47 and 48 respectively which have circular openings coaxially received in spaced relation by the coils 38 and 39.

The armature assembly including magnets 41 and 42, frames 43 and 44 and rings 47 and 48 are coaxially suspended between bosses 36 and 37 from an elongated support block 49 secured at the top and along the length of the case 33. Cantilevered extensions at either end of the block 49 extend over openings 51 and 52 in the case 33 and receive vertically-positioned leaf springs 53 and 54 which are deflectable in a vertical plane passing through the axis of the magnets. Each spring is connected, at its upper end, to a block extension and, at its lower end, to a corresponding support ring 47 or 48. The resonance frequency of the armature assembly and leaf springs as combined is below the expected calibration frequency range and is determined by the total mass of these elements and the spring constant (in deflection). In one preferred embodiment constructed according to the invention having a resonance frequency of 7 Hz, the magnets as combined are nominally one inch diameter and 3⅛ inches overall length. The leaf springs are ½ inch wide, .004–.005 inch thick, and a 1¹⁄₁₆ inch deflection length.

The manner of producing a standing wave according to the invention and by mass reaction should now be apparent. When the coils 38 and 39 are electrically energized by a sinusoidal voltage within the calibration frequency range, e.g., 10 to 300 Hz., an oscillating magnetic force is applied to the magnets 41 and 42 causing the entire armature assembly to reciprocate relative to the coils. The reaction force to the magnetic force is applied to the water-filled tank 10 through the leaf springs 53 and the intermediately connected structure. Thus, it is apparent that the calibration tank 10 and its associated shaker 30 is completely self-contained and isolated from ground structure but for the compliant members 21 from which they depend.

The manner in which the calibrator is operated in a system will now be described with reference to FIG. 7 wherein conventional electrical components are shown in block diagram form. The output of a sweep oscillator 56 is a sinusoidal electrical signal having a frequency which increases through the calibration frequency range at a predetermined rate. The amplitude of the voltage is controlled by a control input signal from a servo 57. The sweep frequency is amplified in a power amplifier 58 and the output thereof drives the stator coils of the shaker 30. The open-circuit voltages $E_{PG}$ and $E_P$ at the pressure-gradient and pressure hydrophones $H_{PG}$ and $H_P$ are transmitted, respectively, through preamplifiers 59 and 60 to variable bandpass filters 62 and 63. The filters also receive the sweep frequency from the oscillator 56 thereby enabling extraneous signals to be filtered. The filter output signals are fed to log volt converters 64 and 65 which transform the signals into their logarithmic function which, in turn, are connected to a recorder 67 for indication as a function of frequency. The recorder frequency coordinate is derived from the output of the oscillator 56.

In the calibration of pressure-gradient hydrophones it is usually desirable to maintain the open-circuit voltage $E_P$ constant so that the only variable appearing at the recorder 67 will be the open-circuit voltage $E_{PG}$. This is accomplished by taking the open-circuit voltage $E_P$ at the output of the amplifier 60 and operating the servo 57 which, in turn, adjusts the amplitude of the sweep oscillator 56 to regulate the power to the shaker 30. Thus, a typical calibration plot on the recorder 67 is as shown in FIG. 8.

Having now described a preferred embodiment according to the invention, some of the many advantages of the invention should now be apparent. For example, a calibration apparatus for pressure-gradient hydrophones is provided which has substantially all external vibrations isolated from the calibration system. The apparatus is relatively small and lightweight rendering it ideal for laboratory as well as production calibration. It is relatively inexpensive to manufacture and extremely reliable for a wide range of calibration frequencies.

It will be understood of course that various changes in the details, materials, and steps and arrangement of parts which have been herein described and illustrated in order to explain the nature of the invention may be made by those skilled in the art within the principle and scope of the invention as expressed in the appended claims.

What is claimed is:

1. A system for calibrating a pressure-gradient hydrophone, comprising:
   tank means formed to be filled with water and adapted to be compliantly suspended from overhead fixed structure for receiving the pressure-gradient hydrophone at the geometric center thereof;
   shaker means affixed to one end of said tank means for imparting horizontal oscillatory motion thereto;
   a pressure hydrophone supported in said tank means and horizontally displaced from the pressure-gradient hydrophone;
   measuring means for processing the open-circuit voltages of said pressure-gradient and pressure hydrophones;
   power means drivingly connected to said shaker means; and
   control means operatively connected between said measuring means and said power means for controlling the power input to said shaker means in response to the open-circuit voltage of said pressure hydrophone.

2. A system according to claim 1 wherein said tank means further comprises:
   a horizontal rigid-walled cylinder closed at both ends and having an opening at the top midway between the ends;
   a plurality of compliant members each connected at one end to the top of said cylinder adjacent the ends thereof and the other end adapted to be connected to the overhead fixed structure; and
   support means secured to said cylinder across said opening for positioning the pressure-gradient hydrophone at the geometric center of said cylinder.

3. A system according to claim 2 wherein the horizontal distance between the ends of said cylinder is less than the wavelength of the highest anticipated calibration frequency.

4. A system according to claim 3 wherein said support means further comprises:
   a shaft rotatable about a vertical axis in the opening of said cylinder; and
   a graduated scale operatively connected to said shaft for indicating the azimuthal position thereof.

5. A system according to claim 4 wherein said shaker means further comprises:
   a cylindrical housing fixed to one end of said tank means;
   stator means rigidly secured in said housing;
   armature means positioned in said stator means for horizontal oscillation; and
   leaf spring means operatively connected between said tank means and said armature means.

6. A system according to claim 5 wherein said power means further comprises:
   sweep oscillator means having its output signal connected to the input of said shaker means.

7. A system according to claim 6 wherein said control means further comprises:
   servo means having an input for receiving the open-circuit voltage of said pressure hydrophone and having an output operatively connected to the input of said sweep oscillator means for modifying the amplitude of the output frequency therefrom.

8. A system according to claim 7 wherein said measuring means comprises:
   bandpass filter means operatively connected to receive the output signals from said pressure-gradient and pressure hydrophones and the output of said sweep oscillator means for passing discrete frequency signals indicative of the hydrophone response;
   log volt converter means receiving said filter means output signals and converting said signals to logarithmic functions thereof; and
   recorder means receiving said converter means output signals and said sweep oscillator means output signal for indicating the respective signals as a function of frequency.

References Cited
UNITED STATES PATENTS

| | | | |
|---|---|---|---|
| 3,224,246 | 12/1965 | Schloss et al. | 73—1(DV) |
| 2,597,005 | 5/1952 | Kendall | 73—1(DV) |

S. CLEMENT SWISHER, Primary Examiner